(12) United States Patent
Ashbrook (10) Patent No.: US 6,578,691 B1
(45) Date of Patent: Jun. 17, 2003

(54) ULTRA-LOW STICTION TORQUE TRANSFER DEVICE

(75) Inventor: Ronald F. Ashbrook, Cincinnati, OH (US)

(73) Assignee: Mach III Clutch, Inc., Ludlow, KY (US)

( * ) Notice: Subject to any disclaimer, the term of this patent is extended or adjusted under 35 U.S.C. 154(b) by 0 days.

(21) Appl. No.: 09/834,516

(22) Filed: Apr. 13, 2001

(51) Int. Cl.[7] .................. F16D 25/04; F16D 13/72; F01B 19/02
(52) U.S. Cl. .................. 192/88 A; 192/113.26; 188/367; 92/98 R
(58) Field of Search .................. 192/70.12, 88 R, 192/88 A, 113.2, 113.23, 113.24, 113.26; 188/367, 71.6, 264 A; 92/96, 98 R (56) References Cited

U.S. PATENT DOCUMENTS

| | | |
|---|---|---|
| 574,269 A | 12/1896 | Richards |
| 1,569,349 A | 1/1926 | Aspinwall et al. |
| 1,572,870 A | 2/1926 | Armstrong |
| 2,057,876 A | 10/1936 | Berry |
| 2,262,709 A * | 11/1941 | Lambert .................. 188/264 A |
| 2,307,456 A | 1/1943 | Fawick |
| 2,370,360 A | 2/1945 | McLean et al. |
| 2,446,694 A * | 8/1948 | Dickson .................. 192/88 A |
| 2,584,190 A | 2/1952 | Danly et al. |
| 2,621,768 A | 12/1952 | Cardwell et al. |
| 2,640,499 A | 6/1953 | Atkins |
| 2,674,356 A | 4/1954 | Eason |
| 2,688,983 A | 9/1954 | Bowerman |
| 2,742,129 A | 4/1956 | Palm |
| 2,745,435 A | 5/1956 | Hobbs |
| 2,762,737 A | 9/1956 | Keller |
| 2,827,142 A | 3/1958 | Aschauer |
| 2,890,776 A | 6/1959 | Aschauer |
| 2,909,255 A | 10/1959 | Chung |
| 2,952,276 A | 9/1960 | Warman, Jr. |
| 2,985,195 A | 5/1961 | Bowerman |
| 2,992,658 A | 7/1961 | Bowerman |
| 2,992,955 A | 7/1961 | Bowerman |
| 3,060,971 A | 10/1962 | Smoll |
| 3,163,274 A | 12/1964 | Bowerman et al. |
| 3,211,266 A | 10/1965 | Abramovitz et al. |
| 3,506,101 A | 4/1970 | Fey |
| 3,667,581 A | 6/1972 | Hanks |
| 3,837,420 A * | 9/1974 | Kobelt .................. 188/71.6 |
| 3,862,678 A * | 1/1975 | Collins .................. 192/88 A |

(List continued on next page.)

Primary Examiner—Richard M. Lorence
(74) Attorney, Agent, or Firm—Wood, Herron & Evans, L.L.P.

(57) ABSTRACT

A ultra-low stiction torque transfer device (10) having a pair of relatively rotatable members (14, 16) actuated by a fluid-actuated diaphragm actuator (72). The diaphragm (72) features a circular or annular planar extensible web (74) having an O-ring (76, 78) positioned at each peripheral edge hereof for sealing a fluid communication space (86). Each O-ring (76, 78) is received, but not clamped, between a groove (87, 89) having an inclined wall (107, 109) and a lip (88, 90) overhanging the groove (87, 89). A portion of each O-ring (76, 78) makes a sealing contact with the respective inclined wall (107, 109) to seal the fluid communication space (86). The web (74) is extended by the application of fluid pressure to the fluid communication space (86). The extending web (74) moves a piston (18) which urges the relatively rotatable members into frictional engagement. As the web (74) extends, each O-ring (76, 78) rotates and translates within its respective groove (87, 89). The lips (88, 90) retain the rotating and translating O-rings (76, 78) within the interior of the groove (87, 89) and sealingly engaged with the inclined walls (107, 109). The relatively rotatable members (14, 16) may include cooling holes (118) that provide a flow of cooling air.

90 Claims, 3 Drawing Sheets

U.S. PATENT DOCUMENTS

| | | | | |
|---|---|---|---|---|
| 4,085,344 | A | 4/1978 | Eddens | |
| 4,263,992 | A | 4/1981 | Moore et al. | |
| 4,294,343 | A | * 10/1981 | Reh | 192/113.23 |
| 4,450,943 | A | 5/1984 | Long, Jr. | |
| 4,469,203 | A | 9/1984 | Herbulot et al. | |
| 4,624,355 | A | 11/1986 | Mroz | |
| 4,666,166 | A | 5/1987 | Hart et al. | |
| 4,708,229 | A | 11/1987 | Anderson et al. | |
| 4,717,117 | A | 1/1988 | Cook | |
| 4,773,519 | A | 9/1988 | Candle et al. | |
| 4,830,160 | A | 5/1989 | Marshall | |
| 4,901,830 | A | 2/1990 | Dolby | |
| 4,915,017 | A | 4/1990 | Perlov | |
| 4,941,323 | A | 7/1990 | Leigh-Monstevens | |
| 4,982,824 | A | 1/1991 | Fukatani | |
| 4,989,537 | A | 2/1991 | Hutchinson, Sr. et al. | |
| 5,073,149 | A | 12/1991 | Maruyama et al. | |
| 5,107,887 | A | 4/1992 | White et al. | |
| 5,107,974 | A | 4/1992 | Fukuyama | |
| 5,220,863 | A | 6/1993 | Scott et al. | |
| 5,224,572 | A | * 7/1993 | Smolen, Jr. et al. | 188/218 XL |
| 5,279,182 | A | 1/1994 | Fukushima | |
| 5,280,829 | A | 1/1994 | Forsythe | |
| 5,357,846 | A | 10/1994 | Rudolph et al. | |
| 5,417,313 | A | 5/1995 | Matsuzaki et al. | |
| 5,421,438 | A | 6/1995 | Flotow et al. | |
| 5,437,219 | A | 8/1995 | Scott et al. | |
| 5,439,083 | A | 8/1995 | Brock et al. | |
| 5,586,635 | A | * 12/1996 | Nelson et al. | 192/88 A |
| 5,909,788 | A | 6/1999 | Pearl et al. | |
| 5,971,120 | A | 10/1999 | Bessemer et al. | |
| 6,116,387 | A | 9/2000 | Kao et al. | |

* cited by examiner

ULTRA-LOW STICTION TORQUE TRANSFER DEVICE

FIELD OF THE INVENTION

The present invention relates to torque transfer devices and, in particular, to fluid-actuated clutch and brake assemblies for the transfer of torque.

BACKGROUND OF THE INVENTION

Torque transfer devices, such as friction clutches and brakes, are used in industrial applications to allow equipment to cycle more rapidly and/or more accurately than otherwise possible by using a selectively-operable motor alone. In particular, friction clutches are used to engage or disengage a load from the motor. Similarly, friction brakes are used to perform one of three basic functions: to stop the motion of a load, to hold a load stationary, or to slow a load. Torque transfer devices typically rely on either electromagnetism, pneumatic pressure, hydraulic pressure, or mechanical pressure, to either push or draw together adjacent pairs of friction surfaces to create a clamping force and, thereby, transfer torque between a pair of relatively rotatable members of the equipment. One important application of torque transfer devices is in winding and unwinding operations for delicate sheet material.

Conventional pneumatic and hydraulic torque transfer devices rely on fluid pressure to transfer rotary power between the pair of relatively rotatable members, mediated by the engagement of the friction surfaces. Specifically, fluid pressure is selectively applied to move a movable piston for urging the friction surface of one rotatable member into a frictional engagement with the friction surface of the other rotatable member. The fluid pressure is supplied to a sealed fluid communication space adjacent the moveable piston, which applies a force to actuate the piston. One common method of sealing the space is to provide a pair of spaced-apart O-ring seals carried by the body within which the piston moves. The O-rings compressively engage sealing surfaces on the exterior of the piston and, thereby, create a fluid-tight sliding seal. Another common method of sealing the enclosed space is to provide an annular sliding U-cup seal adjacent to the piston. The U-cup has side walls that slidingly move in contact with sealing surfaces in the enclosed space confining the U-cup.

Sliding fluid seals, such those provided by O-rings and U-cups, are susceptible to artifacts of static friction or stiction. Stiction is defined as the resistance to the start of motion and is usually quantified as the force required to overcome static friction and make two stationary materials slide against each other. Stiction exists when the value of the static friction exceeds the value of sliding friction between a seal and its corresponding sealing surface. O-rings experience significant stiction at their points of contact against the sealing surfaces. U-cups experience significant stiction where the inner and outer diameters of the side walls of the U-cup contact sealing surfaces. Stiction inhibits the movement of the fluid-actuated piston such that torque transfer devices have a poor sensitivity at low fluid pressures. Stiction causes the piston to suddenly lurch forward at the start of a stroke to engage the clutch or brake because the force needed to overcome static friction is significantly greater than the force of sliding friction experienced after motion is initiated. Stiction also causes the piston to have an intermittently jerky or jumpy movement during its travel as stiction is repeatedly experienced and overcome. Moreover, the presence of stiction may cause O-rings to distort and ultimately extrude from their glands. In particular, stiction is most perceptible when a low fluid pressure is applied to actuate the torque transfer device. Therefore, torque transfer devices employing O-rings and U-cups for actuation operate poorly at low fluid pressures.

Some conventional torque transfer devices utilize the inflation and deflation of a bladder or a tube for moving the piston. Bladders have minimal stiction because of the absence of sliding seals so that, in general, torque transfer devices actuated by bladders are sensitive to the application of a low fluid pressures. However, bladders are disadvantageous in that, as the components of the clutch or brake wear, the bladder cannot adjust to the increased dimensional tolerances so that the ability to transfer torque is lessened over the service life of the clutch or brake. Moreover, bladders require an air inlet hose to provide fluid pressure to the interior of the bladder which is difficult to route through the unit. Furthermore, bladders are prone to rupture at high fluid pressures.

Other conventional torque transfer devices apply a force to move the piston by utilizing an extensible diaphragm actuator having clamped peripheral edges. Each peripheral edge is secured by a two-piece frame or other similar clamping structure. Because diaphragm actuators lack sliding seals, torque transfer devices utilizing diaphragms have minimal stiction and are generally sensitive to the application of medium to high fluid pressures. However, a significant disadvantage of clamped diaphragm actutators is their relative insensitivity at low applied fluid pressures. Furthermore, the clamping of the peripheral edges limits the capability of the associated torque transfer device to accommodate the increased dimensional tolerances arising from wear. As the torque transfer device ages, its torque transfer ability degrades because the clamped peripheral edges of the diaphragm actuator cannot adjust or otherwise compensate for wear. Clamped diaphragms are typically dimensionally large so that the design of the torque transfer device must be dimensioned accordingly to accommodate the clamped diaphragm. Clamped diaphragms also present significant problems in fabrication and assembly that limit their applicability in torque transfer devices.

When the frictional surfaces of the torque transfer device are engaged, a significant amount of heat is generated. The heat energy is distributed through the torque transfer device by thermal conduction throughout the components of the torque transfer device. Typically, conventional torque transfer devices incorporate air passageways in the rotatable members to establish an air current to dissipate the heat energy by convection. However, despite the presence of the air current, the operation of the torque transfer device may be adversely affected because the ventilation afforded by the air passageways is inadequate to sufficiently reduce the operational temperature.

Accordingly, there is a need for an improved fluid actuator for torque transfer devices that permits operation with minimal stiction at low or high applied fluid pressures and that is simply incorporated into the design of torque transfer devices. Furthermore, there is a need for improved heat dissipation in a torque transfer device.

SUMMARY OF THE INVENTION

The present invention provides a torque transfer device that operates without perceptible stiction at both low and high fluid pressures for smooth rotary power transfers, that does not require routing an inlet hose through the device to provide fluid pressure, and that can compensate for increasing dimensional tolerances due to component wear. The torque transfer device of the present invention achieves these objectives by relying upon a diaphragm actuator that selectively urges a pair of relatively rotatable members into frictional engagement by applying a substantially linear force to a piston that urges the rotatable members into engagement. The diaphragm has a generally planar extensible web having an outer peripheral edges and an O-ring integral with the outer peripheral edge. The web is extensible by fluid pressure between an unextended and an extended state. The O-ring includes inner and outer aspects defined to respective sides of a plane bisecting the O-ring in a direction perpendicular to the web in the unextended state. The O-ring is received by a groove in a body member and has an inner aspect sealingly contacting an inclined wall of the groove. The body member also has a lip extending toward the web and over the groove so as to contact the O-ring along only its outer aspect in the unextended state of the web. As a result, the lip holds the O-ring in the groove while allowing the O-ring to sealingly move, such as by rotation and/or translation, therein.

In certain embodiments of the present invention, the web of the diaphragm actuator may be annular and may further include a second O-ring integral with an inner peripheral edge thereof. The second O-ring is positioned in a second groove disposed in the body member and utilizes a second lip for holding the second O-ring within the second groove while allowing the second O-ring to sealingly move therein.

By virtue of the foregoing, there is provided an improved diaphragm actuator for a torque transfer device well-suited to rotary power transfer applications requiring smooth motion at low or high fluid pressures and, in particular, for rotary power applications involving the motion of light-weight objects or delicate loads at either slow or high speeds. The diaphragm actuator of the present invention is self-contained and, as a result, the O-ring(s) are retained within the groove(s) without clamping so that the O-ring(s) may translate and rotate within the associated groove(s) while retaining a fluid-tight seal therewith. As a result, the diaphragm actuator can self-adjust to compensate for frictional wear of the friction disk and other moving components that alters dimensional tolerances between the components. To that end, each O-ring of the diaphragm actuator is moveably captured by a lip overhanging its groove, so that the torque transfer device has a reduced stiction at both low and high fluid pressures. The lip permits the O-ring to translate and rotate its groove while retaining a fluid-tight engagement.

In another aspect, the present invention provides structure for cooling a pair of relatively rotatable transfer members of a torque transfer device when the members are in an engaged condition for transferring torque. To that end, one of the pair of transfer members includes a plurality of radially-extending cooling holes, wherein each cooling hole has a substantially circular cross-sectional profile and a substantially uniform diameter along its length.

By virtue of the foregoing, the operating temperature of the pair of torque transfer members is lowered when the members are frictional engaged and, as a result, the occurrence of heat-related failures is significantly reduced and the operating lifetime of the torque transfer device is significantly increased.

These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrates an embodiment of the invention and, together with a general description of the invention given above, and the detailed description of the embodiment given below, serve to explain the principles of the invention.

DETAILED DESCRIPTION

The present invention is a torque transfer device operable for selectively transferring rotary power between a pair of relatively rotatable members. In use as a clutch assembly, as described in detail below, the first of the rotatable members is powered, and rotating with an initial angular velocity, and the second of the rotatable members is rotating only when engaged with the first rotatable member. When engaged, the two relatively rotatable members rotate with a common final angular velocity, which may be equal to or less than the initial angular velocity of the powered rotatable member. In alternative embodiments, the clutch assembly may be reconfigured as a brake for dissipating rotary power to, when the relatively rotatable members are engaged, either halt or slow the rotation of one of the relatively rotatable members from an initial angular velocity to a second lesser final angular velocity, which may be zero.

Figure 1:
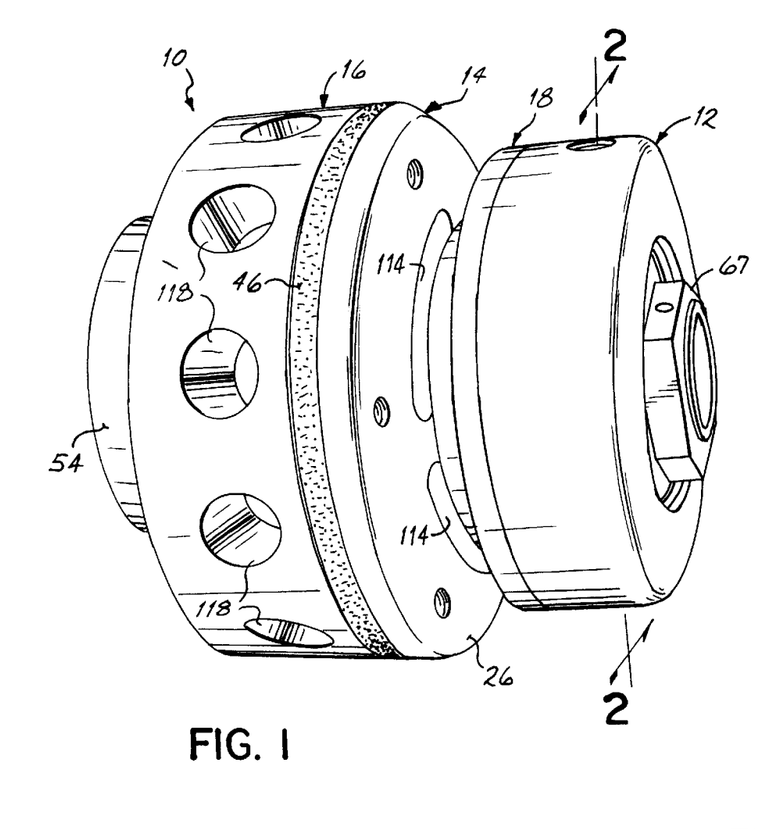
FIG. 1 is a perspective view of a clutch assembly embodying principles of the present invention.
Figure 2:
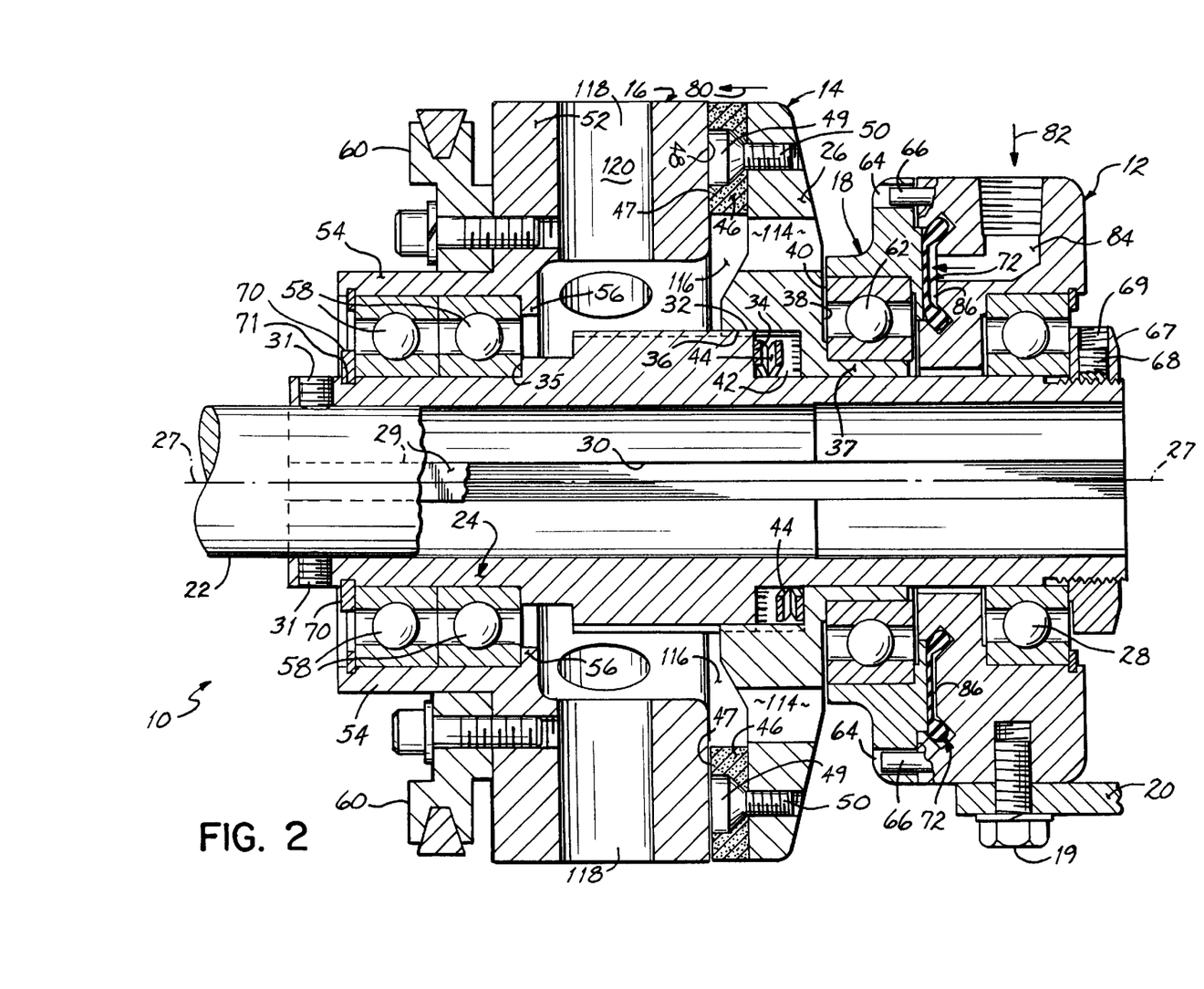
FIG. 2 is a cross-sectional view taken along line 2—2 of the clutch assembly of FIG. 1, in which the upper half of the assembly is illustrated in an engaged condition and the lower half of the assembly is illustrated in a disengaged condition for purposes of illustrating the operation of the clutch assembly.

With reference to FIGS. 1 and 2, the clutch assembly 10 of the present invention includes a body member 12, a driven member 14 rotatably carried by the body member 12, a driving member 16 rotatable relative to the driven member 14, and a piston 18 moveably over a limited axial distance with respect to the body member 12. The body member 12 is preferably affixed by a plurality of conventional threaded fasteners, such as bolts 19, to a support structure 20, such as the frame of a machine. As a result, the body member 12 remains stationary and non-rotating at all times relative to the driven member 14 and relative to the driving member 16, but the present invention is not so limited. The piston 18 is axially moveable with respect to the body member 12 to produce a frictional engagement between the driving member 16 and the driven member 14. When the driving member 16 and driven member 14 are in an engaged condition, as illustrated in the upper half of FIG. 2, rotational force or torque is transferred from the driving member 16 to the driven member 14 for effecting the transfer of rotary power therebetween. When the driving member 16 and driven member 14 are in a disengaged condition, as illustrated in the lower half of FIG. 2, the driving member 16 rotates with a given angular velocity without transferring torque to the driven member 14.

With reference to FIG. 2, the driven member 14 includes an elongate cylindrical shaft 22, a generally-cylindrical sleeve 24 irrotationally affixed to the outside of the shaft 22, and an annular flange 26 resiliently mounted for substantially linear movement to the sleeve 24. The shaft 22, a central bore of the sleeve 24 and a central bore of the flange 26 have collinear longitudinal axes which are aligned for collective rotation about a common longitudinal axis of rotation 27. The shaft 22 of the driven member 14 extends through the aligned bores of the piston 18, the body member 12 and the driving member 16 and is rotationally isolated from the body member 12 by a ball bearing 28. A longitudinally extending key 29 projecting outwardly from the exterior of the shaft 22 is received in and engages a longitudinally extending keyway 30 embossed in the interior of the sleeve 24. The key 29 and keyway 30 have complementary interlocking structures for providing a non-rotating engagement between the sleeve 24 and shaft 22. A plurality of conventional fasteners, such as set screws 31, are received in complementary threaded holes provided in the sleeve 24 for preventing axial movement of the shaft 22 relative to the body member 12. The exterior of the sleeve 24 also includes a plurality of planar surfaces or flats 32 disposed about a portion of its outer circumference. Each flat 32 is transversely-planar about the circumference of sleeve 24 and has a longitudinal axis generally aligned with the axis of rotation 27. A rearward shoulder 34 and a forward shoulder 35 are also provided on the exterior of the sleeve 24 for reasons to be discussed below.

The annular flange 26 extends radially outwardly relative to the axis of rotation 27 and has a plurality of planar surfaces 36 disposed about an inner periphery of flange 26 that are configured and positioned to engage the flats 32 on sleeve 24. The flange 26 is movable over short distances parallel to the axis of rotation 27 by the sliding movement of planar surfaces 36 against the flats 32 of sleeve 24. The flange 26 includes an engagement face 38 that has a confronting relationship with a complementary engagement face 40 of the piston 18. A plurality of spring pockets 42 are spaced at substantially equal angular intervals about an inner diameter of the flange 26. Each spring pocket 42 is dimensioned and configured to receive a wave spring washer 44. The wave spring washers 44 are generally aligned for compression substantially parallel to the axis of rotation 27 and cooperate to apply a substantially-linear resilient force distributed uniformly about the circumference of flange 26. Each wave spring washer 44 is constructed of a material having elastic properties such that the washers 44 return to their original uncompressed condition upon release of the load applied by the piston 18 to the flange 26 and can do so for a significant number of loading/unloading cycles extending over the service life of the clutch assembly 10. The wave spring washers 44 maintain a spaced relationship between an annular friction disk 46 carried by the flange 26 and the driving member 16, when the clutch assembly 10 is in the disengaged condition, and apply an axial force that must be overcome to produce the engaged condition.

With continued reference to FIG. 2, the annular ring-shaped friction disk 46 is removeably attached on the opposite side of flange 26 from the engagement face 38. The friction disk 46 includes an engagement face 47 oriented toward a complementary confronting engagement face 48 disposed on the driving member 16. A plurality of countersunk openings 49 are provided about the circumference of the friction disk 46 which receive conventional threaded fasteners 50 to attach the friction disk 46 to internally-threaded bolt holes provided in the flange 26. The friction disk 46 is composed of a frictional material having a high coefficient of friction when in contact with the material of the driving member 16 but which accommodates the significant portion of the frictional wear among the two materials. Accordingly, the friction disk 46 may be replaced when the frictional wear from the operation of the clutch assembly 10 has eroded a significant amount of the frictional material. The selection of such frictional materials is readily understood by those of ordinary skill in the art.

The driving member 16 comprises an annular disk 52 and an integral cylindrical flange 54 extending axially from an inner periphery of the annular disk 52. The flange 54 incorporates a circular shoulder 56 that extends radially inward from the inner periphery of the annular disk 52 toward the axis of rotation 27. The driving member 16 is rotatably carried by a pair of substantially identical ball bearings 58 on a cylindrical exterior portion of sleeve 24. As a result, the driving member 16 is rotationally isolated from the driven member 14, except when the clutch assembly 10 is in an engaged condition. The driving member 16 is rotated about the axis of rotation 27 by a mechanical driver, such as an electrically-powered motor (not shown), operably connected by a belt or chain to a sprocket or pulley 60 carried by the driving member 16. Alternatively, the driving member 16 and motor may be operably interconnected by a geared transmission or the like.

Figure 3:
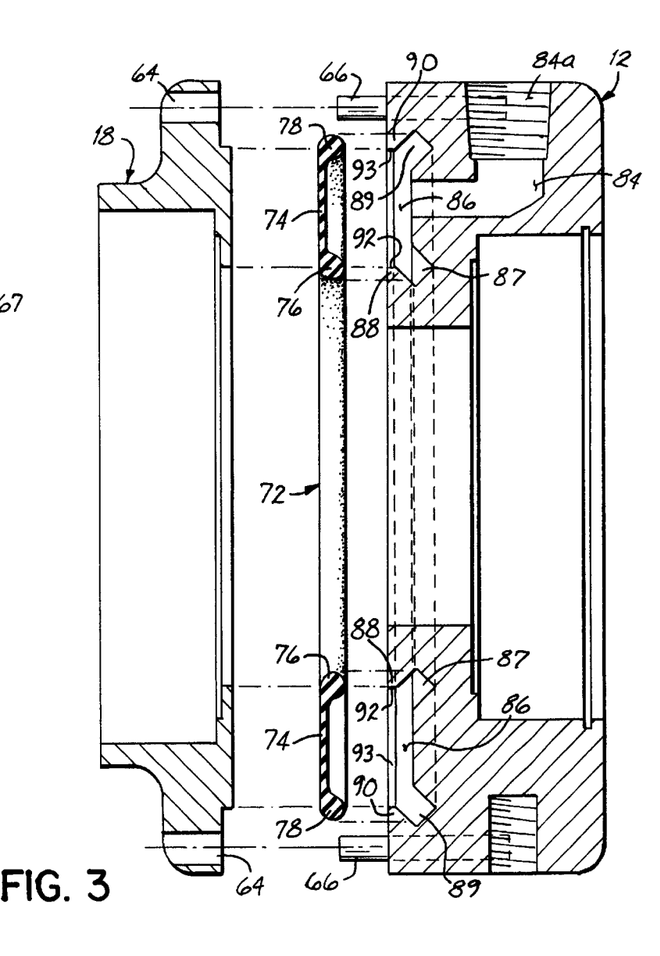
FIG. 3 is an exploded view of a portion of the clutch assembly of FIG. 1.

With continued reference to FIG. 2, the piston 18 is an annular structure rotatably carried by a ball bearing 62 on a cylindrical support flange 37 extending axially from an inner periphery of annular flange 26. The piston 18 is disposed axially between the body member 12 and the annular flange 26. The piston 18 is moveable on ball bearing 62 over a limited distance parallel to the axis of rotation 27. As best shown in FIG. 3, a plurality of angularly-spaced guide holes 64 are provided in the outer periphery of the piston 18 for axially receiving therein for slidable movement a corresponding plurality of guide pins 66 affixed to the body member 12. When the clutch assembly 10 is actuated, the movement of the guide pins 66 in the guide holes 64 constrains the piston 18 to linear motion substantially parallel to the axis of rotation 27 and assists the ball bearing 62 in preventing rotational motion of the piston 18 relative to the body member 12.

The engagement face 40 of the piston 18 is adapted to provide a surface suitable for contacting the engagement face 38 of the annular flange 26 and that is sufficient to transfer torque from the driving member 16 to the driven member 14. The wave spring washers 44 provide a spring-loaded bias that maintains the piston 18 and the annular flange 26 in the disengaged condition relative to the driven member 14. When the piston 18 displaces the annular flange 26 parallel to the axis of rotation 27 with a load or force that overcomes the spring-loaded bias of wave spring washers 44, the friction disk 46 and driving member 16 contact and engage. Torque is thereby transmitted from the driving member 16, through the coupled friction disk 46 and annular flange 26, to the driven member 14 so that the shaft 22 rotates and transfers rotary power along its length external to the clutch assembly 10.

An annular nut or retaining ring 67 is provided at one end of the clutch assembly 10 for capturing the piston 18, the annular flange 26 of the driven member 14, the body member 12, and the ball bearings 58 against the rearward shoulder 34 of the sleeve 24. The retaining ring 67 is threadingly attached to a complementary threaded exterior portion of the sleeve 24 and is secured to sleeve 24 by one or more fasteners, such as a set screw 68, received in a threaded opening 69 extending through to the sleeve 24. When the retaining ring 67 is removed, the piston 18, annular flange 26 and body may be removed from the one end of the clutch assembly 10. An annular retaining ring 70 is disposed in an annular groove 71 provided at an opposite end and about an outer circumference of sleeve 24. Retaining ring 70 captures the driving member 16 and the inner ring of each ball bearing 58 in an abutting engagement against the forward shoulder 35 of the sleeve 24. When the retaining ring 70 is removed, the driving member 16 may be removed from the other end of the clutch assembly 10.

With reference to FIGS. 2 and 3, the clutch assembly 10 of the present invention includes a diaphragm actuator 72 which is selectively operable for applying a linear force to move the piston 18 and, thereby, actuate the clutch assembly 10 between the disengaged and engaged conditions. The diaphragm actuator 72 comprises generally planar, disk-shaped extensible web 74, an inner O-ring 76 integral with and extending about an inner peripheral edge of the web 74, and an outer O-ring 78 integral with and extending about an outer peripheral edge of the web 74. The diaphragm actuator 72 is positioned adjacent to the piston 18 and generally between the piston 18 and the body member 12. The driving shaft 22 projects within the inner periphery of the extensible web 74. The web 74 and O-rings 76, 78 are formed of an elastomeric material with suitable elastic properties and durability to accommodate repeated movements of the piston 18 between the disengaged and engaged conditions. Representative elastomeric materials for use in fabricating diaphragm actuator 72 include polychloroprene (neoprene), a fluorinated hydrocarbon such as Viton®, and a butadiene acrylonitrile such as buna-nitrile. The elastomeric material may be reinforced with fibers or the like.

The diaphragm actuator 72 is adapted to selectively translate the piston 18 parallel to the axis of rotation 27, as indicated generally by arrow 80, so as to apply a force to the annular flange 26 of the driven member 14 for urging the friction disk 46 to engage the driving member 16. To that end, the web 74 is extensible from an unextended condition to an extended condition when fluid pressure is applied, as diagrammatically shown by dashed line 82 (FIG. 4A), via a fluid passageway 84 to a shallow fluid communication space, which may have the form of annular cavity 86, provided in the body member 12. In the extended condition, a significant portion of the web 74 contacts a surface area of the piston 18 to provide a contact area therebetween for transferring a linear force to the piston 18 that is proportional to the applied air pressure and the surface area of piston 18 contacted by web 74 and that is sufficient to overcome the opposing force of the biasing of the piston 18 by the wave spring washers 44.

As best shown in FIG. 3, the inner O-ring 76 is positioned in an inner O-ring groove 87 provided in the body member 12 and held, but not clamped, within the groove 87 by an inner lip 88. The outer O-ring 78 is likewise positioned within an outer O-ring groove 89 provided in the body member 12 and held, but not clamped, in the groove 89 by an outer lip 90. The inner groove 87 and the outer groove 89 are preferably circular and have a radially-spaced and substantially concentric relationship about the body member 12. The inner and outer lips 88 and 90 preferably are circular and have edges 92 and 93, respectively, that define the radial boundaries of the ring-shaped entrance to the annular cavity 86. The annular cavity 86 has a variable volume depending upon the positioning of the plane of the web 74. The annular cavity 86 is covered in a generally concentric and coextensive manner by the web 74 of the diaphragm actuator 72 and is sealed on one side by a sealing compressive engagement of O-rings 76, 78 in grooves 87, 89. The annular cavity 86 is sealed on the opposite side by an annular portion of the body member 12 with the exception of the inlet at one end of the fluid passageway 84. The oppose end of the fluid passageway 84 terminates with a threaded outlet 84a that is adapted to receive a complementary threaded fitting terminating a conduit from a remote source of fluid pressure (not shown). The source of fluid pressure is selectively-operable for supplying, for example, pressured air to the conduit in a pressures range between about 0.5 p.s.i. and about 100 p.s.i., for example.

Figure 4A:
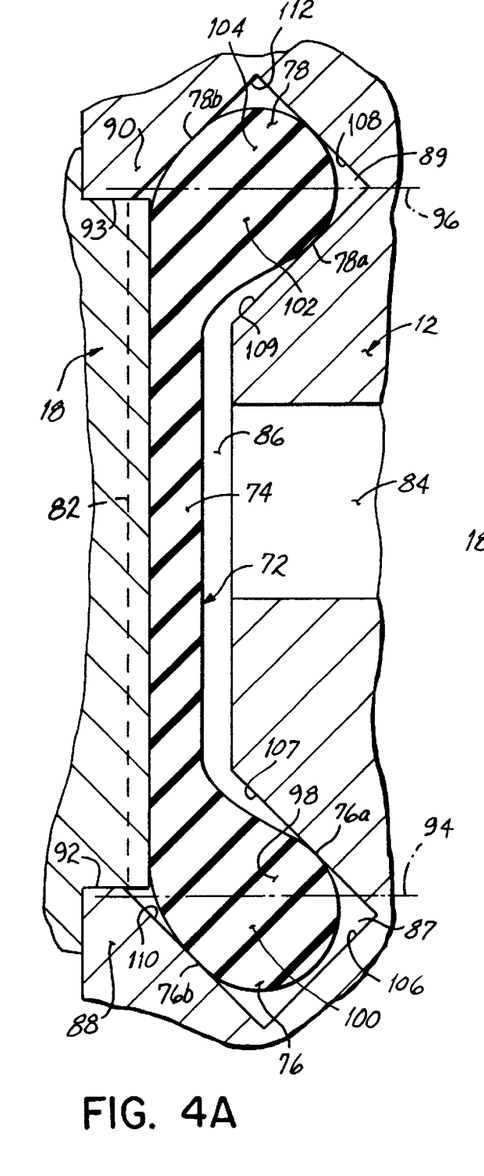
FIG. 4A is an enlarged cross sectional view of a portion of the clutch assembly of FIG. 1, illustrated in the disengaged condition.

With reference to FIG. 4A, the diaphragm actuator 72 is illustrated in the unextended condition with no air pressure applied to the web 74. At each point about the circumference of the inner O-ring 76, a plane 94 can be defined which bisects the inner O-ring 76 in a direction perpendicular to the unextended web 74. Likewise, a plane 96 can be defined bisecting the outer O-ring 78 in a direction perpendicular to the unextended web 74 and at each point about the circumference of the outer O-ring 78. The inner O-ring 76 has an inner aspect 98 and an outer aspect 100 defined to respective sides of plane 94, respectively. Likewise, the outer O-ring 78 has an inner aspect 102 and an outer aspect 104 defined to respective sides of plane 96, respectively. The inner aspects 98, 102 are attached to and integral with the web 74 and, preferably, the inner aspects 98, 102 have a substantially tangential attachment to the plane of the web 74. It is understood that the web 74 may extend radially beyond the outer aspects 100, 104 as a result of, for example, flashing or the like.

The inner groove 87 has a base wall 106 and an inclined wall 107 and, similarly, the outer groove 89 has a base wall 108 and an inclined wall 109. The inclined wall 107 defines a flat surface that is inclined with an inclination angle, with respect to plane 94, which is an acute angle, preferably about 45°. The inclined wall 109 defines a flat surface that is inclined with an inclination angle, with respect to plane 96, which is an acute angle, preferably about 45°. The inclination angles of the inclined walls 107, 109 are preferably equal but the present invention is not so limited. Collectively, the inclined walls 107, 109 are generally aligned as a frustum of a cone and the planes containing each of inclined walls 107, 109 converge toward an shared apex which has an included angle equal to the sum of the inclination angles of each inclined wall 107,109.

The inner O-ring 76 and the outer O-ring 78 are not gripped by or clamped in a stationary manner within their respective grooves 87, 89. When fluid pressure is applied to web 74, the inner O-ring 76 moves, such as by pivoting and translating, within the inner groove 87 and is retained therein by inner lip 88. Similarly, the outer O-ring 78 moves, such as by pivoting and translating, within the outer groove 89 and is retained therein by outer lip 90. Specifically, the inner and outer lips 88, 90 confine the movement of the O-rings 76, 78 within their respective grooves 87, 89 so as to maintain a fluid-tight sealing engagement therebetween for sealing the fluid pressure within the annular cavity 86. To that end, the inner lip 88 has an inner surface 110 that faces the inclined wall 107 in a confronting relationship and that contacts the outer aspect 100 when the web 74 is in its unextended state. Similarly, the outer lip 90 has an inner surface 112 that faces the inclined wall 109 in a confronting relationship and that contacts the outer aspect 104 when the web 74 is in its unextended state. The inner surfaces 110, 112 have angles of inclination, relative to the planes 94 and 96, respectively, that are approximately equal to the inclination angles of the respective confronting inclined walls 107, 109. The separation between the inclined wall 107 and the inner surface 110 and the separation between inclined wall 109 and the inner surface 112 are equal to, or less than, a cross-sectional diameter of the respective inner and outer O-rings 76, 78. Therefore, the inner and outer O-rings 76, 78 may be resiliently compressed when the diaphragm actuator 72 is inserted into grooves 87, 89. However, the resilient compression of the inner and outer O-rings 76, 78 still permits movement within the inner and outer grooves 87, 89.

The base wall 106 of the inner groove 87 interconnects the inclined wall 107 with the inner lip 88 and, similarly, the base wall 108 of the outer groove 89 interconnects the inclined wall 109 with the outer lip 90. The base walls 106, 108 are illustrated, as for example in FIG. 4A, as having a single flat surface. However, the base walls 106, 108 may be configured differently, such as having two angularly joined flat surfaces, without departing from the spirit and scope of the present invention.

Each of the inner and outer O-rings 76, 78 has a substantially circular cross-sectional profile, when uncompressed, as viewed in a plane extending radially through each O-ring 76, 78 and containing a central axis of the diaphragm actuator 72. The inner O-ring 76 has an inner contacting surface 76a that engages the inclined wall 107 and an outer contacting surface 76b that engages the inner cylindrical surface 110 each of the inner lip 88. Likewise, the outer O-ring 78 has an inner contacting surface 78a that engages the inclined wall 109 and an outer contacting surface 78b that engages the inner cylindrical surface 112 of the outer lip 90. Although the inner and outer O-rings 76, 78 are illustrated spaced from the respective one of the base walls 106, 108, the present invention is not so limited.

Figure 4B:
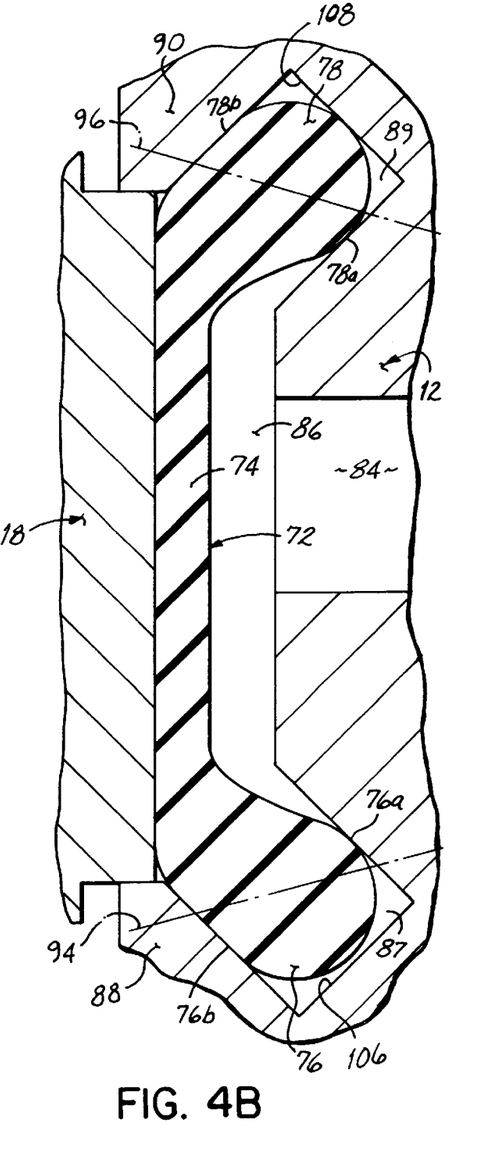
FIG. 4B is an enlarged cross sectional view of a portion of the clutch assembly of FIG. 1, illustrated in the engaged condition.

In use, a pressurized fluid, such as compressed air, is selectively provided by the remote source of fluid pressure through fluid passageway 84 to the annular cavity 86 in the body member 12. As illustrated in FIG. 4B, the extensible web 74 of the diaphragm actuator 72 distends or extends substantially axially and applies a linear axial force to the piston 18, which moves axially. As best shown in the upper half of FIG. 2, the piston 18 transfers the linear axial force to the annular flange 26, which likewise moves axially until significant portions of the friction disk 46 and driving member 16 contact and frictionally engage. Sufficient air pressure must be provided to the annular cavity 86 for overcoming the opposing spring-biasing of the piston 18 and the annular flange 26 by the wave spring washers 44. After frictional engagement is created to establish the engaged condition, sufficient air pressure must be applied to the annular cavity 86 to apply an axial force to the piston 18 that maintains the friction disk 46 and driving member 16 in frictional engagement. The frictional forces that develop between the friction disk 46 and driving member 16 permit torque or rotary power to be transferred from the driving member 16 to the driven member 14. The clutch member 10 is disengaged by discontinuing the supply of pressurized air to the annular cavity 86 and deflating the extensible web 74 of the diaphragm actuator 72. When this occurs, the frictional engagement between friction disk 46 and driving member 16 is released as they separate and the clutch assembly 10 returns to the disengaged condition.

As the web 74 of diaphragm actuator 72 inflates and distends, the inner and outer O-rings 76, 78 translate and rotate with respect to the inclined walls 107, 109 to accommodate the axial displacement of the piston 18 and annular flange 26. The movement of O-rings 76, 78 in grooves 87, 89 also compensates for wear of the moving components of the clutch assembly 10, such as the friction disk 46. The inner and outer lips 88, 90 allow the translation and rotation while retaining the inner and outer O-rings 76, 78 within the respective inner and outer grooves 87, 89. During translation, an inner contact surface 76a of the inner aspect 98 of O-ring 76 and an inner contact surface 78a of the inner aspect 102 of O-ring 78 contacts and slides against the respective inclined wall 107, 109 in a substantially uninterrupted sealed fashion. During rotation, the portions of the inner contact surface 76a of the inner aspect 98 of O-ring 76 and the inner contact surface 78a of the inner aspect 102 of O-ring 78 that contacts against the respective inclined wall 107, 109 may vary but will do so in a substantially uninterrupted sealed fashion.

A primary advantage of a clutch assembly 10 of the present invention is the improved sensitivity at small and large fluid pressures. As a result, the clutch assembly 10 of the present invention exhibits a minimal amount of stiction or running friction when compared with conventional fluid-actuated clutches that employ O-ring-sealed pistons or pistons with U-cups for urging relatively rotatable members into engagement to actuate the assembly. Because the diaphragm actuator 72 does not need to be clamped about its peripheral edges, the diaphragm actuator 72 is self-contained. The ability of the O-rings 76, 78 of the diaphragm actuator 72 to move within the respective grooves 87, 89 and yet retain a fluid-tight seal permits the clutch assembly 10 to self-adjust to compensate for frictional wear of the friction disk 46 and other moving components, in contrast to a conventional pneumatically-actuated clutch assembly utilizing a diaphragm actuator with clamped O-rings.

The driven member 14 and the driving member 16 are relatively rotatable with respect to each other. It is understood by those of ordinary skill that clutch assembly 10 can be powered either through the driving member 16, as described above, or though the driven member 14. If powered by the driven member 14, the frictional engagement between the friction disk 46 and the driven member 14 transfers rotary power or torque from the driven member 14 to the driving member 16. Furthermore, it is understood by those of ordinary skill that the clutch assembly 10 could be converted to function as a brake for slowing or stopping rotary motion if one of the driving member 16 or driven member 14 is a non-rotatable member. If configured as a brake, frictional engagement between the friction disk 46 and the driven member 14 allows, for example, the driven member 14 to transfer torque to the driving member 16 to slow or stop the rotation of driven member 14.

When the clutch assembly 10 is in use, significant amounts of heat are generated by the frictional forces that mediate the transfer of torque between the driving member 16 and the driven member 14. The heat energy is distributed by thermal conduction throughout the clutch assembly 10. According to an aspect of the present invention, the driving member 16 include features that provide a flow of air through the interior of the clutch assembly 10. To that end and with reference to FIGS. 1 and 2, the driving member 16 is provided with a plurality of cooling holes 118 that extend radially outward and are centered on the geometrical center of the driving member 16. Each of the cooling holes 118 has a substantially cylindrical bore 120 which is preferably of a uniform or fixed diameter along its length. The cylindrical bores 120 have a circular crosssection when viewed along the length of the cooling holes 118. A plurality of inlets 114 are provided in the annular flange 26 of the driven member 14 and are connected for fluid communication by respective internal ducts 116 with the cylindrical bores 120 of the cooling holes 118. The cooling holes 114 have the shape of arcuate oval slots and are arranged in a substantially circular pattern about a circumference of the annular flange 26.

The cooling holes 118 promote unobstructed paths for a flow of air through the driving member 16 so that the driving member 16, and other adjacent components, are efficiently ventilated when the clutch assembly 10 is in the engaged condition. The improved ventilation lowers the operating temperature of the clutch assembly 10 by convectively dissipating the frictional heat energy with improved efficiency. As a result, heat-related failures are reduced and the device lifetime is increased. The number and dimensions of the cooling holes 118 can be increased or decreased as required to reflect the specific torque transfer application of clutch assembly 10.

While the present invention has been illustrated by the description of an embodiment thereof and specific examples, and while the embodiment has been described in considerable detail, it is not intended to restrict or in any way limit the scope of the appended claims to such detail. Additional advantages and modifications will readily appear to those skilled in the art. For example, it is contemplated that the inner and outer lips may be separate from the inner and outer grooves in which the O-rings are situated, such as having the form of a separate clamping ring attached in an operable location adjacent to the grooves. Additionally, it is contemplated that the pneumatic actuator may be actuated by any suitable fluid, including liquids as well as gases. The invention in its broader aspects is therefore not limited to the specific details, representative apparatus and methods and illustrative examples shown and described. Accordingly, departures may be made from such details without departing from the scope or spirit of applicant's general inventive concept.

Having described the invention, what is claimed is:

1. A torque transfer device comprising:
   a pair of relatively rotatable members adapted to transfer torque therebetween when urged into frictional engagement;
   a piston movable towards the rotatable members to selectively urge the rotatable members into frictional engagement;
   a diaphragm having a generally planar extensible web with a peripheral edge and an O-ring integrally formed along the peripheral edge, the web being extensible by fluid pressure from an unextended state to an extended state; and
   a body member supporting the diaphragm and being positioned relative to the piston such that the piston moves towards the rotatable members in the extended state of the web, the body member having a groove extending generally transverse to the web for receiving therein the O-ring of the diaphragm and a lip integral with the body as a single piece therewith and extending toward the web and radially over the groove so as to contact a portion of the O-ring, whereby to hold the O-ring in the groove while allowing the O-ring to sealingly move therein.

2. The torque transfer device of claim 1, wherein the O-ring has a substantially circular cross-sectional profile.

3. The torque transfer device of claim 1, wherein the body member includes a fluid communication space through which to apply fluid pressure to the web of the diaphragm and thereby to extend same.

4. The torque transfer device of claim 1, wherein the body member is non-rotatably held relative to the pair of relatively rotatable members.

5. A torque transfer device comprising:
   a pair of relatively rotatable members adapted to transfer torque therebetween when urged into frictional engagement, wherein one of the pair of relatively rotatable members is rotatable and includes a plurality of cooling holes-aligned perpendicular to an axis of rotation of the rotatable member;
   a piston movable towards the rotatable members to selectively urge the rotatable members into frictional engagement;
   a diaphragm having a generally planar extensible web with a peripheral edge and an O-ring integrally formed along the peripheral edge, the web being extensible by fluid pressure from an unextended state to an extended state; and
   a body member supporting the diaphragm and being positioned relative to the piston such that the piston moves towards the rotatable members in the extended state of the web, the body member having a groove for receiving therein the O-ring of the diaphragm and a lip extending toward the web and over the groove so as to contact a portion of the O-ring, whereby to hold the O-ring in the groove while allowing the O-ring to sealingly move therein.

6. The torque transfer device of claim 5, wherein the cooling holes extend radially through the rotatable member.

7. The torque transfer device of claim 5, wherein adjacent pairs of the cooling holes are arranged with substantially equal angular spacings therebetween.

8. The torque transfer device of claim 5, wherein each of the cooling holes has a substantially circular cross-sectional profile perpendicular to the axis of rotation and the cross-sectional profile has a substantially uniform diameter along its length.

9. A torque transfer device comprising:
   a pair of relatively rotatable members adapted to transfer torque therebetween when urged into frictional engagement;
   a piston movable towards the rotatable members to selectively urge the rotatable members into frictional engagement;
   a diaphragm having a generally planar extensible web with a peripheral edge and an O-ring integrally formed along the peripheral edge, the web being extensible by fluid pressure from an unextended state to an extended state, the O-ring having inner and outer aspects defined to respective sides of a plane bisecting the O-ring in a direction perpendicular to the web in the unextended state; and
   a body member supporting the diaphragm and being positioned relative to the piston such that the piston moves towards the rotatable members in the extended state of the web, the body member having a groove with an inclined wall, the O-ring being received in the groove with the inner aspect contacting the inclined wall whereby to form a seal therebetween, the body member having a lip extending toward the web and over the groove so as to contact the O-ring along only the outer aspect thereof in the unextended state of the web, whereby to hold the O-ring in the groove while allowing the O-ring to sealingly move therein.

10. The torque transfer device of claim 9, wherein the O-ring has a substantially circular cross-sectional profile.

11. The torque transfer device of claim 9, wherein the inner aspect of the O-ring is attached to the web.

12. The torque transfer device of claim 11, wherein the inner aspect of the O-ring and the web are aligned along a plane substantially tangent to a surface of the O-ring.

13. The torque transfer device of claim 9, wherein the body member includes a fluid communication space through which to apply fluid pressure to the web of the diaphragm and thereby to extend same.

14. The torque transfer device of claim 9, wherein the groove includes a base wall connecting the lip and the inclined wall, the base wall and inclined wall cooperating to form the groove.

15. The torque transfer device of claim 9, wherein the lip has an inner surface facing the inclined wall, the inner surface contacting the outer aspect of the O-ring when the web is in the unextended state.

16. The torque transfer device of claim 15, wherein the inner surface and the inclined wall having approximately equal angles of inclination relative to the plane bisecting the O-ring.

17. The torque transfer device of claim 16, wherein the angles of inclination are approximately 45°.

18. The torque transfer device of claim 9, wherein the body member is non-rotatably held relative to the pair of relatively rotatable members.

19. The torque transfer device of claim 9, wherein one of the pair of relatively rotatable members includes a friction disk, the friction disk positioned between the pair of relatively rotatable members when frictionally engaged.

20. The torque transfer device of claim 9, wherein one of the pair of relatively rotatable members is rotatable and includes a plurality of cooling holes aligned perpendicular to an axis of rotation of the rotatable member.

21. The torque transfer device of claim 20, wherein the cooling holes extend radially through the rotatable member.

22. The torque transfer device of claim 20, wherein adjacent pairs of the cooling holes are arranged with substantially equal angular spacings therebetween.

23. The torque transfer device of claim 20, wherein each of the cooling holes has a substantially circular cross-sectional profile perpendicular to the axis of rotation and the cross-sectional profile has a substantially uniform diameter along its length.

24. A torque transfer device comprising:
a pair of relatively rotatable members adapted to transfer torque therebetween when urged into frictional engagement;
a piston movable towards the rotatable members to selectively urge the rotatable members into frictional engagement;
a diaphragm having an annular generally-planar extensible web with an inner peripheral edge and an outer peripheral edge, an inner O-ring integrally formed along the inner peripheral edge, and an outer O-ring integrally formed along the outer peripheral edge, the web being extensible by fluid pressure from an unextended state to an extended state, the inner O-ring having an inner aspect and an outer aspect defined to respective sides of a first plane bisecting the inner O-ring in a direction perpendicular to the web in the unextended state, and the outer O-ring having an inner aspect and an outer aspect defined to respective sides of a second plane bisecting the outer O-ring in a direction perpendicular to the web in the unextended state; and
a body member supporting the diaphragm and being positioned relative to the piston such that the piston moves towards the rotatable members in the extended state of the web, the body member having an inner groove with a first inclined wall and an outer groove with a second inclined wall, said inner and outer grooves have a spaced relationship, the inner O-ring being received in the inner groove with the inner aspect contacting the first inclined wall whereby to form a seal therebetween, the outer O-ring being received in the outer groove with the inner aspect contacting the second inclined wall whereby to form a seal therebetween, the body member having an inner lip extending toward the web and over the inner groove so as to contact the inner O-ring along only the outer aspect thereof in the unextended state of the web, the inner lip holding the inner O-ring in the inner groove while allowing the inner O-ring to rotate therein, and the body member having an outer lip extending toward the web and over the outer groove so as to contact the outer O-ring along only the outer aspect thereof in the unextended state of the web, the outer O-ring holding in the outer groove while allowing the outer O-ring to sealingly move therein.

25. The torque transfer device of claim 24, wherein the inner and the outer O-rings have a substantially circular cross-sectional profile.

26. The torque transfer device of claim 24, wherein the inner aspect of the inner O-ring and the inner aspect of the outer O-ring are attached to the web.

27. The torque transfer device of claim 26, wherein the inner aspect of the inner O-ring and the web are aligned along a plane substantially tangent to a surface of the inner O-ring, and the inner aspect of the outer O-ring and the web are aligned along the same plane.

28. The torque transfer device of claim 24, wherein the body member includes a fluid communication space through which to apply fluid pressure to the web of the diaphragm and thereby to extend same.

29. The torque transfer device of claim 24, wherein the inner groove includes a first base wall connecting the inner lip and the first inclined wall, the first base wall and the first inclined wall cooperating to form the inner groove, and the outer groove includes a second base wall connecting the outer lip and the second inclined wall, the second base wall and the second inclined wall cooperating to form the groove.

30. The torque transfer device of claim 24, wherein the inner lip has a first inner surface facing the first inclined wall, the first inner surface contacting the outer aspect of the first O-ring when the web is in the unextended state, and the outer lip has a first inner surface facing the first inclined wall, the first inner surface contacting the outer aspect of the first O-ring when the web is in the unextended state.

31. The torque transfer device of claim 30, wherein the first inner surface and the first inclined wall having approximately equal angles of inclination relative to the first plane bisecting the inner O-ring and the second inner surface and the second inclined wall having approximately equal angles of inclination relative to the second plane bisecting the outer O-ring.

32. The torque transfer device of claim 31, wherein the angles of inclination are approximately 45°.

33. The torque transfer device of claim 24, wherein the body member is non-rotatably held relative to the pair of relatively rotatable members.

34. The torque transfer device of claim 24, wherein one of the pair of relatively rotatable members includes a friction disk, the friction disk positioned between the pair of relatively rotatable members when frictionally engaged.

35. The torque transfer device of claim 24, wherein one of the pair of relatively rotatable members is rotatable and includes a plurality of cooling holes aligned perpendicular to an axis of rotation of the rotatable member.

36. The torque transfer device of claim 35, wherein the cooling holes extend radially through the rotatable member.

37. The torque transfer device of claim 35, wherein adjacent pairs of the cooling holes are arranged with substantially equal angular spacings therebetween.

38. The torque transfer device of claim 35, wherein each of the cooling holes has a substantially circular cross-sectional profile perpendicular to the axis of rotation and the cross-sectional profile has a substantially uniform diameter along its length.

39. An elastomeric member for actuating a torque transfer device with fluid pressure comprising:

a diaphragm including an annular, generally planar extensible web having an inner peripheral edge and an outer peripheral edge, an inner solid O-ring integrally formed along the inner peripheral edge such that a top surface of the web and an outer surface of the inner O-ring join along a curvilinear surface, and an outer solid O-ring formed integrally along the outer peripheral edge such that the top surface of the web and an outer surface of the outer O-ring join along a curvilinear surface, the inner and outer O-rings being substantially co-planar with the web, the web being extensible by fluid pressure from an unextended state to an extended state, the inner O-ring having an inner aspect and an outer aspect defined to respective-sides of a plane bisecting the inner O-ring in a direction perpendicular to the web in the unextended state, the outer O-ring having an inner aspect and an outer aspect defined to respective sides of a plane bisecting the outer O-ring in a direction perpendicular to the web in the unextended state, the inner aspect of the first and second O-rings attached substantially tangential to the plane of the web.

40. The elastomeric member of claim 39, wherein the inner O-ring and the outer O-ring have substantially circular cross-sectional profiles.

41. An elastomeric member for actuating a torque transfer device with fluid pressure comprising:

a diaphragm including an annular, generally planar extensible web having a peripheral edge and a solid O-ring integrally formed along the peripheral edge such that a top surface of the web and an outer surface of the O-ring join along a curvilinear surface, the O-ring being substantially co-planar with the web, the web being extensible by fluid pressure from an unextended state to an extended state, the O-ring having an inner aspect and an outer aspect defined to respective sides of a plane bisecting the O-ring in a direction perpendicular to the web in the unextended state, the inner aspect of the O-ring attached substantially tangential to the plane of the web.

42. The elastomeric member of claim 41, wherein the O-ring has a substantially circular cross-sectional profile.

43. An elastomeric member for actuating a torque transfer device with fluid pressure comprising:

a diaphragm including an annular, generally planar extensible web having an inner peripheral edge and an outer peripheral edge, an inner solid O-ring integrally formed along the inner peripheral edge such that a top surface of the web and an outer surface of the inner O-ring join along a curvilinear surface, and an outer solid O-ring formed integrally along the outer peripheral edge such that the top surface of the web and an outer surface of the outer O-ring join along a curvilinear surface, the inner and outer O-rings each consisting essentially entirely of elastomeric material, the web being extensible by fluid pressure from an unextended state to an extended state, the inner O-ring having an inner aspect and an outer aspect defined to respective sides of a plane bisecting the inner O-ring in a direction perpendicular to the web in the unextended state, the outer O-ring having an inner aspect and an outer aspect defined to respective sides of a plane bisecting the outer O-ring in a direction perpendicular to the web in the unextended state, the inner aspect of the first and second O-rings attached substantially tangential to the plane of the web.

44. The elastomeric member of claim 43, wherein the inner O-ring and the outer O-ring have substantially circular cross-sectional profiles.

45. The torque transfer device of claim 5, wherein the O-ring has a substantially circular cross-sectional profile.

46. A torque transfer device comprising:

a pair of relatively rotatable members adapted to transfer torque therebetween when urged into frictional engagement;

a piston movable towards the rotatable members to selectively urge the rotatable members into frictional engagement;

a diaphragm having a generally planar extensible web with a peripheral edge and an O-ring integrally formed along the peripheral edge, the web being extensible by fluid pressure from an unextended state to an extended state; and a body member supporting the diaphragm and being positioned relative to the piston such that the piston moves towards the rotatable members in the extended state of the web, the body member having a groove extending generally transverse to the web for receiving therein the O-ring of the diaphragm and a lip extending toward the web and over the groove so as to contact a portion of the O-ring, the lip being configured to retain the O-ring in the groove while allowing the O-ring to sealingly move therein.

47. The torque transfer device of claim 46, wherein the O-ring has a substantially circular cross-sectional profile.

48. The torque transfer device of claim 46, wherein the body member includes a fluid communication space through which to apply fluid pressure to the web of the diaphragm and thereby to extend same.

49. The torque transfer device of claim 46, wherein the body member is non-rotatably held relative to the pair of relatively rotatable members.

50. The torque transfer device of claim 46, wherein one of the pair of relatively rotatable members is rotatable and includes a plurality of cooling holes aligned perpendicular to an axis of rotation of the rotatable member.

51. A torque transfer device comprising:

a pair of relatively rotatable members adapted to transfer torque therebetween when urged into frictional engagement;

a piston movable towards the rotatable members to selectively urge the rotatable members into frictional engagement;

a diaphragm having a generally planar extensible web with a peripheral edge and an O-ring integrally formed along the peripheral edge such that a top surface of the web and an outer surface of the O-ring join along a curvilinear surface, the web being extensible by fluid pressure from an unextended state to an extended state; and a body member supporting the diaphragm and being positioned relative to the piston such that the piston moves towards the rotatable members in the extended state of the web, the body member having a groove extending generally transverse to the diaphragm web for receiving therein the O-ring of the diaphragm and a lip extending toward the web and over the groove so as to contact a portion of the O-ring, whereby to hold the O-ring in the groove while allowing the O-ring to sealingly move therein.

52. The torque transfer device of claim 51, wherein the O-ring has a substantially circular cross-sectional profile.

53. The torque transfer device of claim 51, wherein the body member includes a fluid communication space through which to apply fluid pressure to the web of the diaphragm and thereby to extend same.

54. The torque transfer device of claim 51, wherein the body member is non-rotatably held relative to the pair of relatively rotatable members.

55. The torque transfer device of claim 51, wherein one of the pair of relatively rotatable members is rotatable and includes a plurality of cooling holes aligned perpendicular to an axis of rotation of the rotatable member.

56. A torque transfer device comprising:
    a pair of relatively rotatable members adapted to transfer torque therebetween when urged into frictional engagement;
    a piston movable towards the rotatable members to selectively urge the rotatable members into frictional engagement;
    a diaphragm having a generally planar extensible web with a peripheral edge and an O-ring consisting essentially entirely of elastomeric material being integrally formed along the peripheral edge, the web being extensible by fluid pressure from an unextended state to an extended state; and
    a body member supporting the diaphragm and being positioned relative to the piston such that the piston moves towards the rotatable members in the extended state of the web, the body member having a groove for receiving therein the O-ring of the diaphragm and a lip integral with the body as a single piece therewith and extending toward the web and radially over the groove so as to contact a portion of the O-ring, whereby to hold the O-ring in the groove while allowing the O-ring to sealingly move therein.

57. The torque transfer device of claim 56, wherein the O-ring has a substantially circular cross-sectional profile.

58. The torque transfer device of claim 56, wherein the body member includes a fluid communication space through which to apply fluid pressure to the web of the diaphragm and thereby to extend same.

59. The torque transfer device of claim 56, wherein the body member is non-rotatably held relative to the pair of relatively rotatable members.

60. The torque transfer device of claim 56, wherein one of the pair of relatively rotatable members is rotatable and includes a plurality of cooling holes aligned perpendicular to an axis of rotation of the rotatable member.

61. A torque transfer device comprising:
    a pair of relatively rotatable members adapted to transfer torque therebetween when urged into frictional engagement;
    a piston movable towards the rotatable members to selectively urge the rotatable members into frictional engagement;
    a diaphragm having a generally planar extensible web with a peripheral edge arid an O-ring consisting essentially entirely of elastomeric material being integrally formed along the peripheral edge, the web being extensible by fluid pressure from an unextended state to an extended state; and
    a body member supporting the diaphragm and being positioned relative to the piston such that the piston moves towards the rotatable members in the extended state of the web, the body member having a groove for receiving therein the O-ring of the diaphragm and a lip extending toward the web and over the groove so as to contact a portion of the O-ring, the lip being configured to retain the O-ring in the groove while allowing the O-ring to sealingly move therein.

62. The torque transfer device of claim 61, wherein the O-ring has a substantially circular cross-sectional profile.

63. The torque transfer device of claim 61, wherein the body member includes a fluid communication space through which to apply fluid pressure to the web of the diaphragm and thereby to extend same.

64. The torque transfer device of claim 61, wherein the body member is non-rotatably held relative to the pair of relatively rotatable members.

65. The torque transfer device of claim 61, wherein one of the pair of relatively rotatable members is rotatable and includes a plurality of cooling holes aligned perpendicular to an axis of rotation of the rotatable member.

66. A torque transfer device comprising:
    a pair of relatively rotatable members adapted to transfer torque therebetween when urged into frictional engagement;
    a piston movable towards the rotatable members to selectively urge the rotatable members into frictional engagement;
    a diaphragm having a generally planar extensible web with a peripheral edge and an O-ring consisting essentially entirely of an elastomeric material integrally formed along the peripheral edge such that a top surface of the web and an outer surface of the O-ring join along a curvilinear surface, the web being extensible by fluid pressure from an unextended state to an extended state; and
    a body member supporting the diaphragm and being positioned relative to the piston such that the piston moves towards the rotatable members in the extended state of the web, the body member having a groove for receiving therein the O-ring of the diaphragm and a lip extending toward the web and over the groove so as to contact a portion of the O-ring, whereby to hold the O-ring in the groove while allowing the O-ring to sealingly move therein.

67. The torque transfer device of claim 66, wherein the O-ring has a substantially circular cross-sectional profile.

68. The torque transfer device of claim 66, wherein the body member includes a fluid communication space through which to apply fluid pressure to the web of the diaphragm and thereby to extend same.

69. The torque transfer device of claim 66, wherein the body member is non-rotatably held relative to the pair of relatively rotatable members.

70. The torque transfer device of claim 66, wherein one of the pair of relatively rotatable members is rotatable and includes a plurality of cooling holes aligned perpendicular to an axis of rotation of the rotatable member.

71. An elastomeric member for actuating a torque transfer device with fluid pressure comprising:
    a diaphragm including an annular, generally planar extensible web having a peripheral edge and a solid O-ring integrally formed along the peripheral edge such that a top surface of the web and an outer surface of the O-ring join along a curvilinear surface, the O-ring consisting essentially entirely of an elastomeric material, the web being extensible by fluid pressure from an unextended state to an extended state, the O-ring having an inner aspect and an outer aspect defined to respective sides of a plane bisecting the O-ring in a direction perpendicular to the web in an unextended state, the inner aspect of the O-ring attached substantially tangential to the plane of the web.

72. The elastomeric member of claim 71, wherein the O-ring has a substantially circular cross-sectional profile.

73. A torque transfer device comprising:

a pair of relatively rotatable members adapted to transfer torque therebetween when urged into frictional engagement;

a piston movable towards the rotatable members to selectively urge the rotatable members into frictional engagement;

a diaphragm having a generally planar extensible web with a peripheral edge and an O-ring integrally formed along the-peripheral edge and being substantially co-planar with the web, the web being extensible by fluid pressure from an unextended state to an extended state; and a body member supporting the diaphragm and being positioned relative to the piston such that the piston moves towards the rotatable members in the extended state of the web, the body member having a groove for receiving therein the O-ring of the diaphragm and a lip integral with the body as a single piece therewith and extending toward the web and radially over the groove so as to contact a portion of the O-ring, whereby to hold the O-ring in the groove while allowing the O-ring to sealingly move therein.

74. The torque transfer device of claim 73, wherein the O-ring has a substantially circular cross-sectional profile.

75. The torque transfer device of claim 73, wherein the body member includes a fluid communication space through which to apply fluid pressure to the web of the diaphragm and thereby to extend same.

76. The torque transfer device of claim 73, wherein the body member is non-rotatably held relative to the pair of relatively rotatable members.

77. The torque transfer device of claim 73, wherein one of the pair of relatively rotatable members is rotatable and includes a plurality of cooling holes aligned perpendicular to an axis of rotation of the rotatable member.

78. A torque transfer device comprising:

a pair of relatively rotatable members adapted to transfer torque therebetween when urged into frictional engagement;

a piston movable towards the rotatable members to selectively urge the rotatable members into frictional engagement;

a diaphragm having a generally planar extensible web with a peripheral edge and an O-ring integrally formed along the peripheral edge, the O-ring being substantially co-planar with the web, and the web being extensible by fluid pressure from an unextended state to an extended state; and a body member supporting the diaphragm and being positioned relative to the piston such that the piston moves towards the rotatable members in the extended state of the web, the body member having a groove for receiving therein the O-ring of the diaphragm and a lip extending toward the web and over the groove so as to contact a portion of the O-ring, the lip being configured to retain the O-ring in the groove while allowing the O-ring to sealingly move therein.

79. The torque transfer device of claim 78, wherein the O-ring has a substantially circular cross-sectional profile.

80. The torque transfer device of claim 78, wherein the body member includes a fluid communication space through which to apply fluid pressure to the web of the diaphragm and thereby to extend same.

81. The torque transfer device of claim 78, wherein the body member is non-rotatably held relative to the pair of relatively rotatable members.

82. The torque transfer device of claim 78, wherein one of the pair of relatively rotatable members is rotatable and includes a plurality of cooling holes aligned perpendicular to an axis of rotation of the rotatable member.

83. A torque transfer device comprising:

a pair of relatively rotatable members adapted to transfer torque therebetween when urged into frictional engagement;

a piston movable towards the rotatable members to selectively urge the rotatable members into frictional engagement;

a diaphragm having a generally planar extensible web with a peripheral edge and an O-ring substantially co-planar with the web, the O-ring being integrally formed along the peripheral edge such that a top surface of the web and an outer surface of the O-ring join along a curvilinear surface, the web being extensible by fluid pressure from an unextended state to an extended state; and a body member supporting the diaphragm and being positioned relative to the piston such that the piston moves towards the rotatable members in the extended state of the web, the body member having a groove for receiving therein the O-ring of the diaphragm and a lip extending toward the web and over the groove so as to contact a portion of the O-ring, whereby to hold the O-ring in the groove while allowing the O-ring to sealingly move therein.

84. The torque transfer device of claim 83, wherein the O-ring has a substantially circular cross-sectional profile.

85. The torque transfer device of claim 83, wherein the body member includes a fluid communication space through which to apply fluid pressure to the web of the diaphragm and thereby to extend same.

86. The torque transfer device of claim 83, wherein the body member is non-rotatably held relative to the pair of relatively rotatable members.

87. The torque transfer device of claim 83, wherein one of the pair of relatively rotatable members is rotatable and includes a plurality of cooling holes aligned perpendicular to an axis of rotation of the rotatable member.

88. A torque transfer device comprising:

a pair of relatively rotatable members adapted to transfer torque therebetween when urged into frictional engagement;

a piston movable towards the rotatable members to selectively urge the rotatable members into frictional engagement;

a diaphragm having a generally planar extensible web with a peripheral edge and an O-ring integrally formed along the peripheral edge, the web being extensible by fluid pressure from an unextended state to an extended state; and a body member supporting the diaphragm and being positioned relative to the piston such that the piston moves towards the rotatable members in the extended state of the web, the body member having a groove for receiving therein the O-ring of the diaphragm and a lip extending toward the web and over the groove so as to contact a portion of the O-ring, the lip being inclined at an acute angle relative to the groove for retaining the O-ring in the groove while allowing the O-ring to sealingly move therein.

89. The torque transfer device of claim 88, wherein the O-ring has a substantially circular cross-sectional profile.

90. The torque transfer device of claim 88, wherein one of the pair of relatively rotatable members is rotatable and includes a plurality of cooling holes aligned perpendicular to an axis of rotation of the rotatable member.

* * * * *

UNITED STATES PATENT AND TRADEMARK OFFICE
CERTIFICATE OF CORRECTION

PATENT NO. : 6,578,691 B1
DATED : June 17, 2003
INVENTOR(S) : Ronald F. Ashbrook It is certified that error appears in the above-identified patent and that said Letters Patent is hereby corrected as shown below:

<u>Title page,</u>
Item [57], ABSTRACT,
Line 6, change "hereof" to -- thereof --.

<u>Column 10,</u>
Line 64, change "crosssection" to -- cross-section --.

<u>Column 12,</u>
Line 6, delete "-" after "holes".

<u>Column 15,</u>
Line 24, delete "-" after "respective".

<u>Column 17,</u>
Line 65, change "arid" to -- and --.

Signed and Sealed this

Twenty-third Day of December, 2003

JAMES E. ROGAN
*Director of the United States Patent and Trademark Office*